Sept. 26, 1939. S. J. KRANNAK 2,174,421
GREASE GUN
Filed Aug. 15, 1936 2 Sheets-Sheet 1
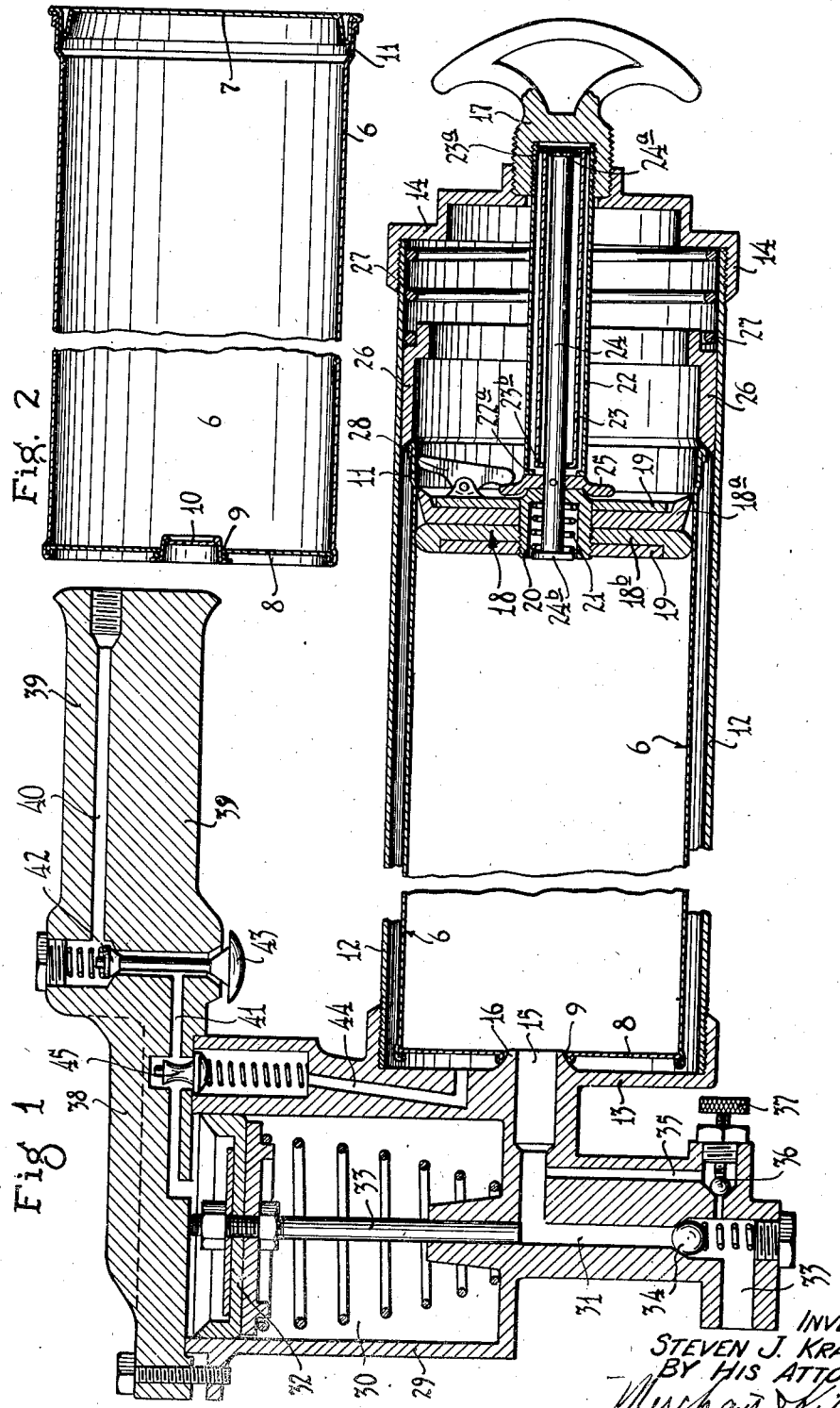
INVENTOR
STEVEN J. KRANNAK
BY HIS ATTORNEYS Sept. 26, 1939.　　　　S. J. KRANNAK　　　　2,174,421
GREASE GUN
Filed Aug. 15, 1936　　　2 Sheets-Sheet 2
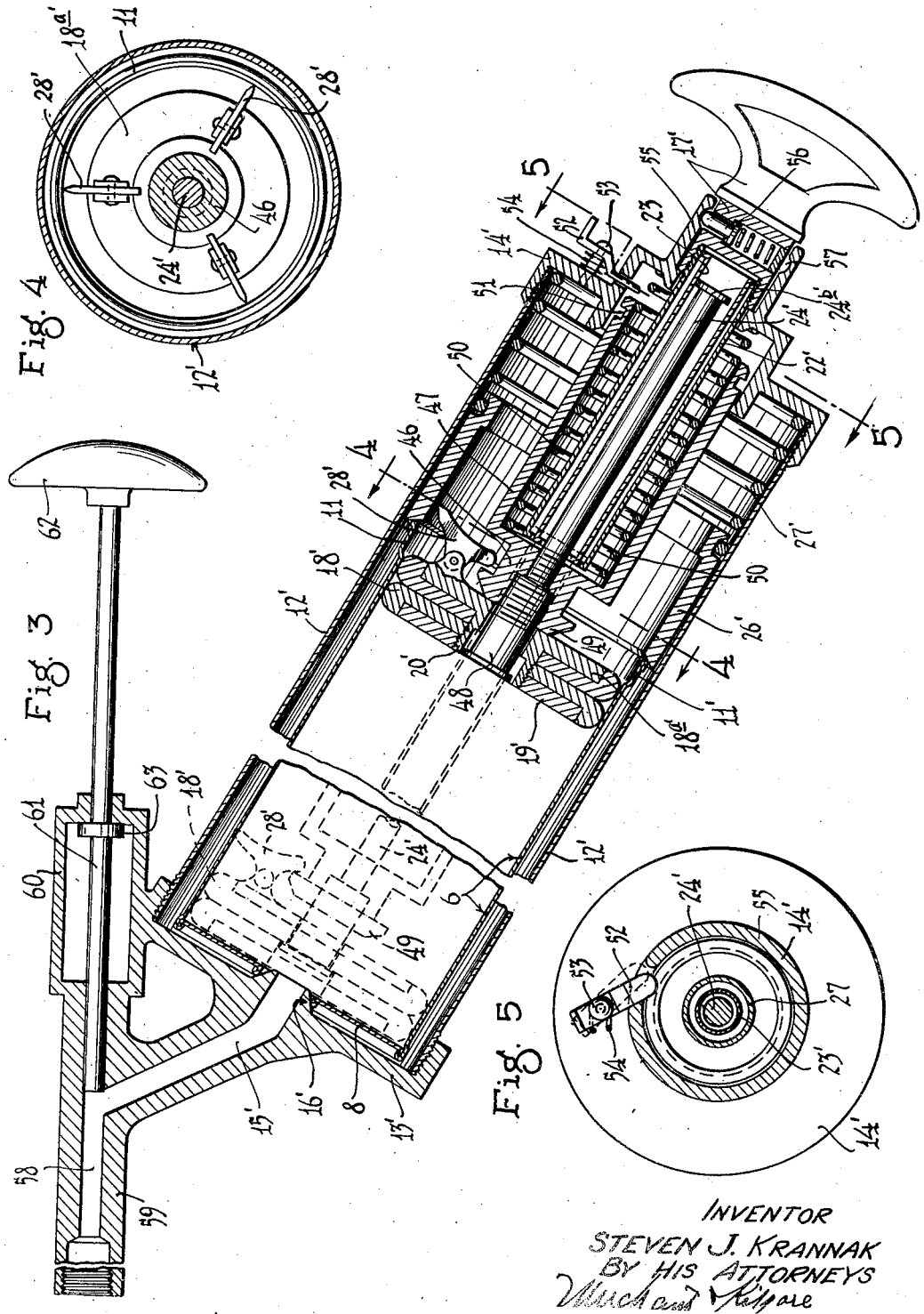
INVENTOR
STEVEN J. KRANNAK
BY HIS ATTORNEYS Patented Sept. 26, 1939

2,174,421

UNITED STATES PATENT OFFICE 2,174,421

GREASE GUN

Steven J. Krannak, Minneapolis, Minn., assignor to Min-A-Max Co., Minneapolis, Minn., a corporation of Minnesota Application August 15, 1936, Serial No. 96,212

12 Claims. (Cl. 221—47.3)

My present invention provides a simple and highly efficient grease gun and a grease-containing cartridge therefor, in an arrangement wherein the contents of the cartridge may be ejected under the action of a piston or like permanent element of the grease gun proper.

The grease-containing cartridge is preferably in the form of a cylindrical, thin sheet metal shell, but may be made of any other suitable material. The cartridge at one end has a large removable head, and at its other end has a small axially discharged passage normally closed by a removable plug or small cap. The grease gun has a containing chamber or barrel, preferably of cylindrical form, provided at one end with a grease discharge nipple, and equipped at its other end with an ejecting piston and co-operating actuating means. The axial discharge nipple of the barrel is insertable into the axial discharge passage of the cartridge; and the ejecting piston, which acts as a follower, is insertable into the large open end of the cartridge, which later is held and centered by a presser device, so that the piston will enter the said cartridge, and the discharge passage at the other end of the cartridge is tightly seated onto the discharge nipple of the barrel head.

The invention also involves novel devices and features, preferred forms of which are illustrated in the drawings. In the drawings, which illustrate two embodiments of the invention, like characters indicate like parts throughout the several views.

Referring to the drawings:

Fig. 1 is an axial section showing the invention embodied in a grease gun in which a high pressure or final grease discharge ejector is operated by air pressure;

Fig. 2 is an axial section showing the cartridge in closed condition;

Fig. 3 is an axial section showing the invention embodied in a grease gun in which the high pressure ejector is hand operated;

Fig. 4 is a transverse section taken on the line 4—4 of Fig. 3; and

Fig. 5 is a transverse section taken on the line 5—5 of Fig. 3.

The cartridge which, as above stated, may be of any suitable material, is preferably made up of a thin sheet metal cylinder 6, provided at one end with a large removable head 7 and provided at its other end with a permanent head 8 having an axial passage 9 normally closed by a removable plug or cap 10. The fixed head 8 is clinched to the delivery end of the cartridge, and the plug 10 is frictionally but securely forced into the axial passage 9. At its other end the cartridge shell 6, for an important purpose which will hereinafter appear, is slightly enlarged or increased in diameter at 11. The large head 7 is frictionally but securely pressed into the enlarged end portion 11 so that, when the head 7 and plug 10 are applied, the cartridge will be sealed liquid-tight and adapted to contain lubricating grease or oil. This cartridge shell with grease or lubricating material is adapted to be shipped and handled like other canned materials, and the cartridge is ready at any time to be quickly inserted into the grease gun.

The grease gun, illustrated in Fig. 1, is of the pneumatic type, and for containing the cartridge it is provided with a barrel or container 12 of very light metal. At its delivery end the barrel 12, by screw-threaded engagement or otherwise, is detachably secured with a fluid-tight joint to a head 13; and at its other end said barrel by like means is detachably secured to a head 14. The head 13 has an axial passage 15 formed through a tapered nipple 16 that projects into the barrel, when the latter is applied to the head 13.

The head 14 is provided with the hub into which by threaded engagement is screwed the shank of an operating head or handle 17 connected as a permanent part of the head 14 and adapted to be inserted into the cartridge, as hereinafter described, as a piston head 18 which, as shown and preferred, comprises disc-like piston plates 18$^a$ and 18$^b$ and clamping discs 19. The discs 19 are shown as screw-threaded onto a hub 20 and securely clamp the disc-like plates 18$^a$ and 18$^b$ together. These plates 18$^a$ and 18$^b$ are of a pliable material, such as leather, rubber, or composition material. The hub 20 as shown, is a hollow structure and contains a quite light coil spring 21.

The operating head 17 is connected to the piston head by means of a telescopically extensible piston stem, as shown, made up of three elements 22, 23 and 24. The outer member 22 is a tubular structure which, at its outer end, is rigidly secured to the head 17 and at its inner end has an inturned flange 22$^a$. The member 23 is of tubular form and of such diameter as to pass through the opening of the flange 22$^a$, but at its outer end is provided with an outturned flange 23$^a$ that will engage said flange 22$^a$. The member 24 is a rod telescoped into the member 23 and provided at its outer end with a collar 24$^a$ that is engageable with an inturned flange 23ᵇ on the inner end of member 23. The inner end of rod 24 is extended with a loose joint which will pass air through the outer end of the hub 20, and at its extreme inner end said member 24 is provided with a collar 24ᵇ that engages the outer end of spring 21. Keyed, pinned, or otherwise rigidly secured on the rod 24 is a valve-acting collar or flange 25 which, when pressed against the adjacent end of hub 20, closes the air passage between said rod or member 24 and the contracted end of the hub 20. The important purpose of this structure will appear in the description of the operation.

Working slidably within the barrel 12 is an annular pressure collar 26, the inner edge of which is inwardly beveled for engagement with the large adjacent end of the cartridge shell 11. This collar 26 is subject to a heavy coiled spring 27 compressed between the shoulder end thereof and the head 14. When the head 7 and the plugs 10 have been removed and the cartridge is placed in the barrel, as shown in Fig. 1, the rim of the axial opening 16 will be tightly pressed with the fluid-tight joint on the tapered discharge nipple 15, under the action of the spring 27. The manner in which the cartridge will be opened up and applied, as shown in Fig. 1, will be fully described.

One or more cartridge shell distorting dogs 28 are intermediately pivoted to the rear or outer piston head plate 19, and subject to the action of the projecting flange of the valve 25, perform the function that will more fully appear in the description of the operation.

The barrel head 13 in the structure illustrated is shown as cast or formed integral with the shell or casing 29 of a differential high compression encased ejector. This casing 29 is formed with a relatively very large cylinder 30 and with a relatively very small cylinder discharge passage 31. Working in the large cylinder 30 is a large piston head 32 that carries a plunger 33 that fits the small cylinder or discharge passage 31 and acts as an ejecting piston or plunger. The inner end of each cylinder or discharge passage 31 is in communication with the grease passage 15 of the head 13, and the discharge end of said cylinder 31 leads to a final discharge passage 33 which, in turn, will be connected to the grease discharge pipe or other final discharge conduit.

Numeral 34 indicates a spring pressed check valve between small cylinder 31 and discharge passage 33, which freely opens to permit a discharge of grease, but checks a back flow. Numeral 35 indicates a relief passage that extends from the connection between passage 15 and cylinder 31 and opens into the discharge passage 33 beyond the check valve 34. This passage 35 is normally closed by a choke valve 36 subject to a clamping screw 37.

The outer end of large cylinder 30 is closed by a head 38 which, as shown, is formed integral with a handle 39. Compressed air will be delivered to the cylinder 30 and against the piston head 32 through air conduits 40 and 41. Normally, communication between air conduits 40 and 41 is shut off by spring pressed valve 42 which has an exposed finger or thumb piece 43 adapted to be pressed to open said valve.

Air conduit 41 is adapted to be connected to the barrel 12 through a branch air conduit 44 in which is a lightly spring pressed check valve 45.

Figs. 3, 4 and 5 illustrate the invention embodied in a grease gun in which the high compression or final grease ejector is a hand operated device. In these views, the same cartridge illustrated in Figs. 1 and 2 is employed, and hence, the parts thereof are indicated by the same characters. A great deal of the mechanism of the barrel and interior mechanism of the grease gun are herein identical or substantially the same as corresponding parts previously described, and hence, these corresponding similar parts are indicated by the same characters with the prime marks.

In this structure, the rod or stem section 24' is screwed or otherwise rigidly applied in the neck 46 of a large sleeve 47 that surrounds but is spaced from the outer stem section 22'. The rod or stem section 22' in this structure is provided with a supplemental section 48 that is screwed into the neck 46 and has a flanged front end that works with clearance in the cavity of the hub 20'. The neck 46 has a flanged end 49 between which the inner end of the sleeve 47 works with clearance. The said flanged end 49 is normally pressed against the piston head and closes the passage around the stem extension 48, under the action of a coiled spring 50 contained within said sleeve and reacting against the sleeve and the head 14'. The outer end of sleeve 50 is beveled, and adjacent thereto is provided with a lock groove 51. Numeral 52 indicates a small latch or lock lever mounted on a stud 53 projecting from the head 14'. This latch lever is subject to a tension spring 54 that causes the inner end of said lock lever to engage the lock groove 51 when the latter is aligned therewith.

The outer end of the outer stem section 24' is screwed in or otherwise rigidly secured to a shank of an operating handle 17'. The shank of this handle 17' is telescoped into a projecting neck 55 of a head 14' and is quite securely but movably latched to said neck, under the action of a spring pressed latch plunger 56 mounted in said shank and engageable with an annular groove 57 of said neck.

In this modified structure, the head 13' is provided with a tapered nipple 16' onto which the small opening in the end of the cartridge head 8 is adapted to be pressed, under the action of the spring pressed collar 26'. The passage nipple 16' is connected by a conduit 15' to the bore or barrel 58 of an ejecting grease gun 59 which, as shown, is cast or made integral with or otherwise rigidly secured to the head 13' and is formed with an enlarged extension 60. An ejecting piston in the form of a rod or plunger 61 works in the barrel 58 and, as shown, is provided at its extended end with an operating knob 62, and within the enlarged extension 60 with a stop collar 63.

*Operation of the structure illustrated in Figs. 1 and 2*

The loading of the grease gun with the filled cartridge may be very easily performed as follows: the cartridge set upright with its large head 7 at the top, and the said head 7 will then be removed. The barrel 12 is detached from the head 13 and telescoped down over the partially open cartridge, and the piston is forced initially into the receiving end of the cartridge shell. Normally, the cartridge shell will not be quite filled with grease so that it is an easy matter to press the piston slightly into the normal diameter of the cartridge shell. Expanded end of the cartridge shell assists in effecting the initial entry of the piston into the shell.

When the piston has thus been initially entered into the cartridge shell, it is turned open end up, and the plug 10 is then removed. Next the head 13 with the attached parts is turned so that the nipple 16 is depending, and then said head 13 is screwed onto or otherwise rigidly secured to the barrel 12, thereby forcing the tapered nipple 16 into the open axial discharge passage of the cartridge. When the two heads are thus applied to the barrel 12 and the shank of the handle 17 is screwed into the hub of the head 14, as shown in Fig. 1, the outer stem section 22 will press the valve 25 tightly against the hub of the piston head, thereby closing the air passage between said hub and the rod 24, and the piston head will then be moved into the cartridge shell, approximately as shown in Fig. 1. At such time, of course, the collar 26, under the action of the spring 27, will tightly seat the rim of the axial passage 9 onto the nipple 16. It is important to note that the beveled edge of the collar 26, during the above operations, served to keep the cartridge shell centered in respect to the axis of the barrel 12, thereby making entry of the piston initially into the cartridge shell an easy matter.

The above noted initial movement of the piston head into the cartridge shell served to discharge enough grease from the cartridge to fill the barrel or small cylinder 31 of the differential high pressure grease ejector. When the valve head 43 is pressed, valve 22 will open communication between conduits 40 and 41, and this will simultaneously admit air under pressure against the large ejector piston 32 and through the passage 44 into the shell 12 and against the back or outer face of the piston head 18—19.

The spring closed valve 46 acts as a pressure reduction valve so that less air pressure per square inch will be introduced against the cartridge end piston than against the large piston 32 of the high pressure grease ejector. The pressure against the cartridge engaged piston, however, will be sufficient to always keep the barrel 31 always filled with grease but not sufficient to open check valve 34. In view of the very much larger area of piston 32 than of plunger 33, the grease discharged through discharge passage 38 will be under very high pressure.

After the grease has been ejected from the cartridge, the follower-acting piston will be withdrawn from the cartridge shell. At the time that this piston reaches the head 8 of the cartridge, the piston stem, made up of the sections 22, 23 and 24, will be extended as far as they can go, and hence, withdrawal of the stem will retract the piston. In effecting this return movement of the piston, the handle 17 will be unscrewed from the head 14. Initial return movement of this piston from the cartridge shell will take place under a partial vacuum produced in the shell. Whenever this partial vacuum, acting on the piston against the pull on the stem, is sufficient to compress spring 21 to overcome spring 21, valve 25 will be pulled away from the hub 20 of the piston, thereby permitting atmospheric pressure to enter the shell, thereby making the withdrawal of the piston an easy matter.

It is now important to note that this initial return movement of the piston in moving the valve 25 to open position, causes said valve to act on the inner end of the cutting or distorting dog or dogs 28, thereby forcing the outer ends of said dogs against the cartridge shell so that outward movement of the piston will cause said dog to either cut or groove or otherwise distort the cartridge shell so that it can not be again used as a container. This cutting or distorting device will be applied when, and only when, it is desirable to prevent refilling of the cartridge.

The valve 36 forms no part of the present invention, but it may be stated that the purpose thereof is to relieve the discharge pipe or conduit from pressure after the injection of grease so as to relieve certain types of coupling nozzles to receiving nipples, and thereby rendering the disconnection of the said elements an easy matter.

*Operation of the structure illustrated in Figs. 3, 4 and 5*

The operation of the structure illustrated in Figs. 3, 4 and 5 must be quite obvious in many respects from the description of the operation of the structure illustrated in Figs. 1 and 2. However, this last noted structure being of a manually operated type, the following statements are deemed desirable: When the sleeve 47 is drawn to an extreme outward position, its beveled end will cam the latch lever 52 into engagement with the lock groove 51 and will hold said sleeve against the movement later to be imparted thereto by the spring 50.

The manner of introducing the cartridge into the grease gun and of initially entering the follower-acting piston into the cartridge shell is very much the same as that previously described. That is, when the barrel 12' is connected to the head 13' with the cartridge applied therein, the piston will be initially entered into the cartridge shell. Then, when the latch lever 52 is pressed and the sleeve 27 released, the spring 50 will force the flange end 49 against the piston, thereby closing the air passage through the hub 20' and pressing the said piston into the cartridge shell as far as it will be permitted to go by the contents of the cartridge.

When the piston has moved to its extreme position indicated by dotted lines in Fig. 3, and the piston is to be retracted, handle 17' will be pulled out of the head 14', and the then extended piston stem will be caused to pull the piston backward and out of the cartridge shell. Initial backward pull on the piston stem, in addition to retracting the piston, performs two operations, to wit: It causes the cutting dogs 28' to engage and distort the cartridge shell, and initial movement of said stem permitted by the recess in the hub 20' moves flange 49 out of engagement with piston and admits air into the cartridge shell, thereby relieving the action of partial vacuum which would otherwise resist the retraction of the piston.

The operation of the high pressure grease ejector involving the plunger acting stem 71 is, of course, perfectly obvious.

What I claim is:

1. In a grease gun structure, a barrel-like casing, a front head to which said barrel is secured, said head having an axial discharge passage, a rear head for said barrel, a grease-containing cartridge having at one end an axial discharge passage adapted to form a fluid tight joint with the axial discharge passage of said front end, said cartridge having a full diameter open rear end, a piston head adapted for insertion into said large open end of said grease cartridge, means for yieldingly pressing said piston head into said grease cartridge and means for retracting the same, and a yieldingly pressed collar substantially fitting said casing and engageable with the rim of the open end of said grease cartridge to seat the same.

2. The structure defined in claim 1 in further combination with a distorting dog movably applied to said piston head and operative under retracting movements to distort the wall of the grease container.

3. The structure defined in claim 1 in which said collar is a beveled edge operative to center the grease container in respect to said piston head.

4. The structure defined in claim 1 in which the means for retracting said piston head includes an element on which said piston is mounted for limited sliding movements, and a distorting dog pivoted to said piston head and subject to initial retracting movement of said retracting means to move said dog against the wall of the grease container and cause distortion thereof under the retracting movement of the piston head.

5. In a grease gun structure, a barrel-like casing, a front head to which said barrel is detachably secured, said front head having a grease discharge passage, a rear head secured to said barrel, grease-containing cartridge having at one end an axial passage adapted to form a fluid tight joint with the axial discharge passage of said front head, said cartridge having the full diameter open rear end, a piston head adapted for insertion into the large open end of said cartridge, means for yieldingly pressing said piston head into said cartridge, and a retracting plunger working through the rear head of said casing and connected to said piston head, said casing when removed from said front head being adapted to receive the grease-containing cartridge therein while said piston head remains within said container and attached to its operating means, and yielding pressure device reacting against said outer head and operative on the outer rim of said cartridge to seat the same against the front head.

6. In a grease gun structure, a barrel-like casing, a front head to which said barrel is detachably secured, said front head having a grease discharge passage, a rear head secured to said barrel, a grease-containing cartridge having at one end an axial passage adapted to form a fluid tight joint with the axial discharge passage of said front head, said cartridge having the full diameter open rear end, a piston head adapted for insertion into the large open end of said cartridge, means for yieldingly pressing said piston head into said cartridge, and a retracting plunger working through the rear head of said casing and connected to said piston head, said casing when removed from said front head being adapted to receive the grease-containing cartridge therein while said piston head remains within said container and attached to its operating means, in further combination with a spring-pressed collar substantially fitting said casing and operative on the large open end of said cartridge to hold the same seated.

7. In a grease gun structure, a barrel-like casing, a front head to which said barrel is detachably secured, said front head having a grease discharge passage, a rear head secured to said barrel, a grease-containing cartridge having at one end an axial passage adapted to form a fluid tight joint with the axial discharge passage of said front head, said cartridge having the full diameter open rear end, a piston head adapted for insertion into the large open end of said cartridge, means for yieldingly pressing said piston head into said cartridge, and a retracting plunger working through the rear head of said casing and connected to said piston head, said casing when removed from said front head being adapted to receive the grease-containing cartridge therein while said piston head remains within said container and attached to its operating means, said piston head being capable of slight axial movements in respect to its retracting plunger, and in further combination with a distorting dog pivoted to said piston head and rendered active by initial piston retracting movements of said plunger to cause distortion of the walls of the cartridge under continued retracting movement of said piston head.

8. In a grease gun structure, a barrel-like casing, a front head to which said barrel is detachably secured, said front head having a grease discharge passage, a rear head secured to said barrel, a grease-containing cartridge having at one end an axial passage adapted to form a fluid tight joint with the axial discharge passage of said front head, said cartridge having the full diameter open rear end, a piston head adapted for insertion into the large open end of said cartridge, means for yieldingly pressing said piston head into said cartridge, and a retracting plunger working through the rear head of said casing and connected to said piston head, said casing when removed from said front head being adapted to receive the grease-containing cartridge therein while said piston head remains within said container and attached to its operating means, in further combination with means operative on said retracting plunger to lock said piston head in a retracted position.

9. In a grease gun structure, a barrel-like container, a front head to which said barrel is detachably secured, said head having an axial discharge passage, a rear head for said barrel, an ejecting plunger mounted on said rear head and having means for projecting and retracting the same axially of said barrel, and a grease-containing cartridge having at one end an axial discharge passage adapted to form a fluid tight joint with the axial discharge passage of said front end, said cartridge having a full diameter open rear end into which said ejecting piston is insertable, in further combination with the spring-pressed collar spring connected to said rear head and engageable with the large end of said cartridge to seat the discharge passage of the latter against the discharge passage of said front head, said collar having a beveled front edge for centering the cartridge shell in respect to said ejecting plunger.

10. In a grease gun structure, a barrel-like casing, a front head to which said barrel is secured, said head having an axial discharge passage, a rear head for said barrel, a grease-containing cartridge having at one end an axial discharge passage adapted to form a fluid tight joint with the axial discharge passage of said front end, said cartridge having a full diameter open rear end, a piston head adapted for insertion into said large open end of said grease cartridge, means for yieldingly pressing said piston head into said grease cartridge and means for retracting the same, and a yieldingly pressed collar substantially fitting said casing and engageable with the rim of the open end of said grease cartridge to seat the same.

11. In a dispensing gun for plastic material, a barrel-like casing including front and rear head members, the front head member having a discharge passage, one of the head members being detachable from the barrel, a cartridge for plastic material adapted to be removably disposed in the casing when such head member is detached, said cartridge having a discharge passage adapted to form a fluid-tight joint with the discharge passage of the front head member when the cartridge is moved endwise toward the front head, the end of the cartridge opposite the discharge passage being open, plunger means extending from the rear head member and adapted to enter the open end of the cartridge to express the contents therefrom, and a spring pressed member movably carried by the casing and which yieldingly engages the rim of the open end of the cartridge when the detachable head member is in place on the casing, so that the spring pressed member exerts pressure through the cartridge in a manner tending to maintain said fluid-tight joint.

12. The arrangement according to claim 11 wherein the spring pressed member is of annular form for continuous engagement with the rim of the cartridge, and has a spring behind it which reacts against the rear head member to force the cartridge toward the front head member.

STEVEN J. KRANNAK.